United States Patent
Griffin et al.

(10) Patent No.: US 11,366,787 B2
(45) Date of Patent: Jun. 21, 2022

(54) QUANTUM FILE MIGRATION

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

(*) Notice: Subject to any disclaimer, the term of this patent is extended or adjusted under 35 U.S.C. 154(b) by 119 days.

(21) Appl. No.: 17/004,897

(22) Filed: Aug. 27, 2020

(65) Prior Publication Data
US 2022/0066985 A1    Mar. 3, 2022

(51) Int. Cl.
*G06F 16/13*    (2019.01)
*G06F 16/11*    (2019.01)
*G06N 10/00*    (2022.01)

(52) U.S. Cl.
CPC ............ *G06F 16/119* (2019.01); *G06F 16/13* (2019.01); *G06N 10/00* (2019.01)

(58) Field of Classification Search
CPC ........ G06F 16/119; G06F 16/13; G06N 10/00
USPC ....................................................... 707/822
See application file for complete search history.

(56) References Cited

U.S. PATENT DOCUMENTS

| | | | |
|---|---|---|---|
| 8,589,479 B2 | 11/2013 | Doddavula | |
| 8,880,489 B2 | 11/2014 | Basu et al. | |
| 8,977,673 B2 | 3/2015 | Little | |
| 10,637,583 B2 | 4/2020 | Henningsen et al. | |
| 11,010,145 B1* | 5/2021 | Smith | G06N 10/00 |
| 2011/0153257 A1* | 6/2011 | Ishizaka | G06N 10/00 702/109 |
| 2017/0230174 A1* | 8/2017 | Choi | H04L 9/12 |
| 2019/0034651 A1* | 1/2019 | Griffin | G06F 21/6218 |
| 2019/0146772 A1* | 5/2019 | Griffin | G06F 8/71 717/121 |
| 2020/0128063 A1 | 4/2020 | Griffin et al. | |
| 2020/0326977 A1* | 10/2020 | Gambetta | G06F 9/5044 |
| 2020/0401427 A1* | 12/2020 | Gambetta | G06F 9/546 |
| 2021/0173660 A1* | 6/2021 | Hogaboam | G06F 9/3851 |
| 2021/0342730 A1* | 11/2021 | Redmond | G06N 3/08 |

OTHER PUBLICATIONS

Choi, C. Q., "A Data Bus for Quantum Computers," IEEE Spectrum, Available online at: https://spectrum.ieee.org/tech-talk/computing/hardware/a-quantum-bus-for-quantum-computers, Nov. 9, 2017, 2 pages.

(Continued)

*Primary Examiner* — Hicham Skhoun
(74) *Attorney, Agent, or Firm* — Dority & Manning, P.A.

(57) ABSTRACT

Quantum file migration is disclosed. A first quantum computing system receives a request for the first quantum computing system to provide a quantum file that resides on the first quantum computing system to a second quantum computing system. The quantum file includes a qubit header portion and a qubit data portion. The qubit header portion is stored in one or more qubits implemented by the first quantum computing system, and the qubit data portion is stored in one or more other qubits. In response to the request, the first quantum computing system moves, to the second quantum computing system, the qubit header portion from the one or more qubits implemented by the first quantum computing system to one or more qubits implemented by the second quantum computing system.

20 Claims, 17 Drawing Sheets

(56) References Cited

OTHER PUBLICATIONS

Thaker, Darshan D., et al., "Quantum Memory Hierarchies: Efficient Designs to Match Available Parallelism in Quantum Computing," Available online at: https://dl.acm.org/doi/pdf/10.1145/1150019.1136518, Proceedings of the 33rd International Symposium on Computer Architecture (ISCA'06), 2006, 12 pages.

* cited by examiner

QUANTUM FILE MIGRATION

BACKGROUND

Quantum computing utilizes qubits to perform quantum calculations. Qubits are finite resources. As quantum computing continues to increase in popularity and become more commonplace, an ability to programmatically coordinate access to qubits will be desirable.

SUMMARY

The examples disclosed herein implement quantum file migration of a quantum file from a first quantum computing system to a second quantum computing system to facilitate access of the quantum file by a quantum service executing on the second quantum computing system.

In one example, a method is provided. The method includes receiving, by a first quantum computing system, a request for the first quantum computing system to provide a quantum file that resides on the first quantum computing system to a second quantum computing system, wherein the quantum file comprises a qubit header portion and a qubit data portion, the qubit header portion being stored in one or more qubits implemented by the first quantum computing system and the qubit data portion being stored in one or more other qubits. The method further includes, in response to the request, moving, by the first quantum computing system to the second quantum computing system, the qubit header portion from the one or more qubits implemented by the first quantum computing system to one or more qubits implemented by the second quantum computing system.

In another example, a first quantum computing system is provided. The first quantum computing system includes a memory, and at least one processor device coupled to the memory to receive a request to provide a quantum file that resides on the first quantum computing system to a second quantum computing system, wherein the quantum file comprises a qubit header portion and a qubit data portion, the qubit header portion being stored in one or more qubits implemented by the first quantum computing system and the qubit data portion being stored in one or more other qubits. The processor device is further to, in response to the request, move, to the second quantum computing system, the qubit header portion from the one or more qubits implemented by the first quantum computing system to one or more qubits implemented by the second quantum computing system.

In another example, a non-transitory computer-readable storage medium is provided. The non-transitory computer-readable storage medium includes instructions, which, when executed by a processor device of a first quantum computing system, cause the processor device to receive a request to provide a quantum file that resides on the first quantum computing system to a second quantum computing system, wherein the quantum file comprises a qubit header portion and a qubit data portion, the qubit header portion being stored in one or more qubits implemented by the first quantum computing system and the qubit data portion being stored in one or more other qubits. The non-transitory computer-readable storage medium includes further instructions, which, when executed by a processor device of the first quantum computing system, cause the processor device to, in response to the request, move, to the second quantum computing system, the qubit header portion from the one or more qubits implemented by the first quantum computing system to one or more qubits implemented by the second quantum computing system.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Quantum computing utilizes qubits to perform quantum calculations. Qubits are finite resources. As quantum computing continues to increase in popularity and become more commonplace, an ability to programmatically coordinate access to qubits will be desirable.

The examples disclosed herein implement quantum file migration of a quantum file from a first quantum computing system to a second quantum computing system to facilitate access of the quantum file by a quantum service executing on the second quantum computing system.

Figure 1:
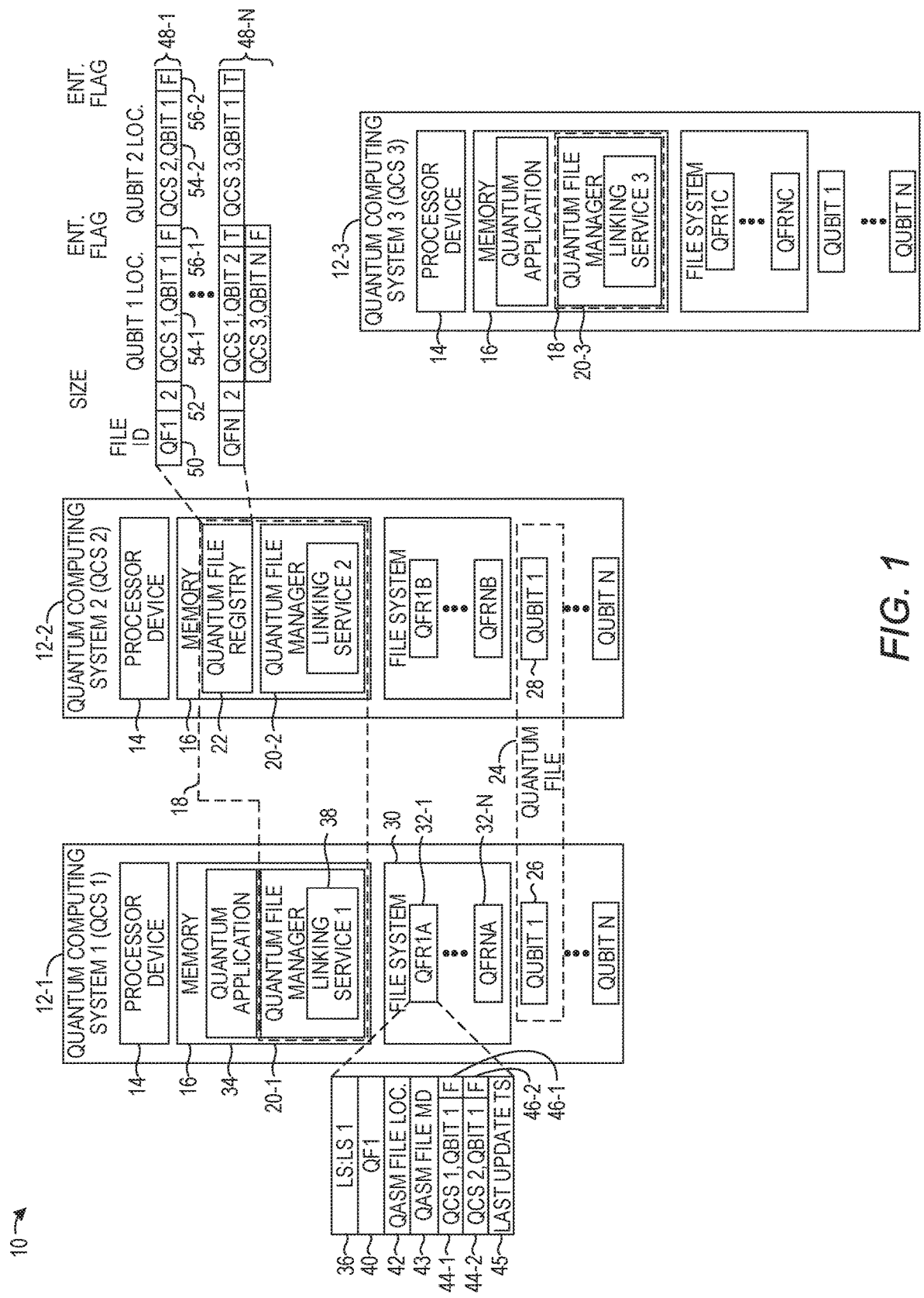
FIG. 1 is a block diagram of an environment according to one example.

FIG. 1 is a block diagram of an environment 10 according to one example. The environment 10 includes a plurality of quantum computing systems 12-1, 12-2 and 12-3 (generally, quantum computing systems 12). The quantum computing systems 12 may be close in physical proximity to one another, or may be relatively long distances from one another, such as hundreds or thousands of miles from one another. The quantum computing systems 12 operate in quantum environments but can operate using classical computing principles or quantum computing principles. When using quantum computing principles, the quantum computing systems 12 perform computations that utilize quantum-mechanical phenomena, such as superposition and entanglement. The quantum computing systems 12 may operate under certain environmental conditions, such as at or near 0° Kelvin. When using classical computing principles, the quantum computing systems 12 utilize binary digits that have a value of either 1 or 0.

Each of the quantum computing systems 12 includes at least one processor device 14 and at least one memory 16. Components of a quantum file management system 18 may be distributed among one or more of the quantum computing systems 12. The quantum file management system 18 includes quantum file managers 20-1-20-3 which operate to implement quantum files on the quantum computing systems 12-1, 12-2 and 12-3, respectively. The quantum file management system 18 also includes a quantum file registry 22 that includes metadata regarding each quantum file implemented in the environment 10, as discussed in greater detail below.

In this example, a quantum file 24 has been implemented in the environment 10. The quantum file 24 is made up of two qubits: a qubit 26 hosted on the quantum computing system 12-1, and a qubit 28 hosted on the quantum computing system 12-2. Mechanisms for generating a quantum file will be discussed below. The quantum file 24, at the point in time illustrated in FIG. 1, is "owned" by the quantum computing system 12-1. As will be discussed below, ownership of the quantum file 24 may be migrated or otherwise transitioned from one quantum computing system 12 to another quantum computing system 12.

The quantum computing system 12-1 includes a file system 30 that includes one or more quantum file references 32-1-32-N (generally, quantum file references 32). Each quantum file reference 32 corresponds to a quantum file maintained in the quantum file registry 22, and that is "owned" by the quantum computing system 12-1. In this example, the quantum file reference 32-1 corresponds to the quantum file 24. The quantum file 24 is accessed by a requestor via the quantum file reference 32-1, and the quantum file reference 32-1 is identified by the requestor via an identifier. In this example, the quantum file reference 32-1 has an identifier of QFR1A.

For purposes of illustration, assume that a quantum file requestor, in this example a quantum application 34, seeks access to the quantum file 24. The quantum application 34 provides the quantum file identifier QFR1A to the quantum file manager 20-1. The quantum application 34 may interface with the quantum file manager 20-1 via any suitable inter-process communications mechanism, such as an application programming interface (API) or the like. In some examples, the quantum file manager 20-1 may be an integral part of a quantum operating system, and the appropriate intercommunication mechanisms between the quantum application 34 and the quantum file manager 20-1 may be generated in response to certain programming instructions, such as reading, writing, or otherwise accessing the quantum file 24 while the quantum application 34 is being compiled.

The quantum file manager 20-1 accesses the file system 30. Based on the quantum file identifier QFR1A, the quantum file manager 20-1 accesses the quantum file reference 32-1. The quantum file reference 32-1 includes metadata about the quantum file 24. In particular, a linking service field 36 identifies a quantum linking service (hereinafter "linking service" for purposes of brevity) associated with the quantum file 24. In this example, the linking service field 36 identifies a linking service 38 as being associated with the quantum file 24.

An internal identifier field 40 identifies an internal quantum file identifier for the quantum file 24. In this example, the internal quantum file identifier is "QF1". In some examples, the quantum file reference 32-1 may include a quantum assembly file (QASM) field 42 that identifies the location of a QASM file that contains programming instructions that access the quantum file 24. The quantum file reference 32-1 may also include a metadata field 43 that identifies information about the quantum file 24, such as, by way of non-limiting example, a creation timestamp of the quantum file 24, a last modification timestamp of the quantum file 24, a current user of the quantum file 24, and the like. The quantum file reference 32-1 identifies each qubit that makes up the quantum file 24, in this example the qubits 26 and 28. In particular, a first qubit identifier field 44-1 contains a qubit identifier of the qubit 26, and a second qubit identifier field 44-2 contains a qubit identifier of the qubit 28. The qubits 26 and 28 may be identified in any desired manner. In some examples, a qubit identifier includes information that identifies the particular quantum computing system 12-1-12-3 on which the qubit is located and a qubit reference number that uniquely corresponds to a particular qubit on the identified quantum computing system 12-1-12-3.

In some examples, data may be spread over the qubits 26, 28 in a manner that dictates that the qubits 26, 28 must be accessed in some sequential order for the data to have contextual meaning. The order in which the qubits 26, 28 are identified in the quantum file reference 32-1 may correspond to the appropriate order in which the qubits 26, 28 should be accessed. In other examples, the quantum file reference 32-1 may have an additional field identifying the appropriate order.

A qubit entanglement status field 46-1 maintains entanglement status information about the qubit 26. In this particular example, the qubit entanglement status field 46-1 indicates that, at the time of the last update of the quantum file reference 32-1, the qubit 26 was not in an entangled state with any other qubit. Similarly, a qubit entanglement status field 46-2 maintains entanglement status information about the qubit 28. The qubit entanglement status field 46-2 indicates that, at the time of the last update of the quantum file reference 32-1, the qubit 28 was not in an entangled state with any other qubit.

A timestamp field 45 identifies a time of last update of the quantum file reference 32-1. The timestamp field 45 may be used, for example, by the quantum file manager 20-1 to determine whether the quantum file registry 22 needs to be accessed to obtain real-time information or not. For example, if the timestamp field 45 indicates that the quantum file reference 32-1 was last updated within a predetermined timeframe, such as, by way of non-limiting example, within the previous 0.001 seconds, the quantum file manager 20-1 may decide that the information in the quantum file reference 32-1 is sufficiently up to date such that the quantum file registry 22 need not be accessed.

The quantum file management system 18 implements a real time, instantaneous updating of the quantum file reference 32-1 prior to granting access to the quantum file 24, for example, prior to granting access to a quantum application that is attempting to read any qubit in the quantum file 24. In particular, the quantum file manager 20-1 causes the quantum linking service 38 to access the quantum file registry 22 to determine a current status of the quantum file 24. The quantum file registry 22 comprises a plurality of quantum file records 48-1-48-N (generally, "quantum file records 48"), each of which corresponds to a quantum file implemented in the environment 10. In this example, the quantum file record 48-1 corresponds to the quantum file 24.

The quantum file record 48-1 includes current metadata regarding the quantum file 24. The metadata may include an internal identifier field 50 that identifies an internal file identifier of the quantum file 24, a size field 52 that identifies the number of qubits that make up the quantum file 24, and for each qubit of the number of qubits that make up the quantum file 24, a qubit identification field and an entanglement status field. In this example, a qubit identification field 54-1 contains a qubit identifier that identifies the qubit 26, and a qubit identification field 54-2 contains a qubit identifier that identifies the qubit 28. An entanglement field 56-1 indicates that the qubit 26 is not currently in an entangled state with any other qubit, and an entanglement field 56-2 indicates that the qubit 28 is not currently in an entangled state with any other qubit. Although not illustrated, the quantum file record 48-1 may also include additional metadata regarding the quantum file 24 as discussed above with regard to the metadata field 43 of the quantum file reference 32-1, such as, by way of non-limiting example, a creation timestamp of the quantum file 24, a last modification timestamp of the quantum file 24, a current user (e.g., current quantum application or current quantum service) of the quantum file 24, and the like.

The linking service 38 or the quantum file registry 22, in response to the query from the linking service 38, may then initiate one or more checks on the quantum file 24. The checks may include whether or not one or more of the qubits 26, 28 are currently in an entangled state. Determining whether a qubit is in an entangled state may be done in any number of ways, such as checking a metadata field, accessing one or more QASM files that include instructions performed on one or both of the qubits 26, 28, or the like. The checks may also include a determination of whether the quantum file 24 is currently being accessed by other quantum applications, or by a quantum service, such as disclosed in U.S. patent application Ser. No. 16/227,747, the disclosure of which is hereby incorporated by reference herein. The results of these checks may cause an updating of one or more of the entanglement fields 56-1, 56-2. Where other checks are made, the quantum file record 48-1 may include additional fields that identify the outcome of such checks.

The linking service 38 updates the quantum file reference 32-1 with the information from the quantum file record 48-1 and the outcome of any checks, and also updates the timestamp field 45 with the current time. The quantum file manager 20-1 then returns control to the quantum application 34, passing the quantum application 34 at least some of the updated information contained in the quantum file reference 32-1, such as the first qubit identifier field 44-1 and the second qubit identifier field 44-2, and the qubit status information contained in the qubit entanglement status fields 46-1, 46-2. The quantum application 34 may then initiate actions against the qubits 26, 28, such as read actions, write actions, or the like.

Figure 2:
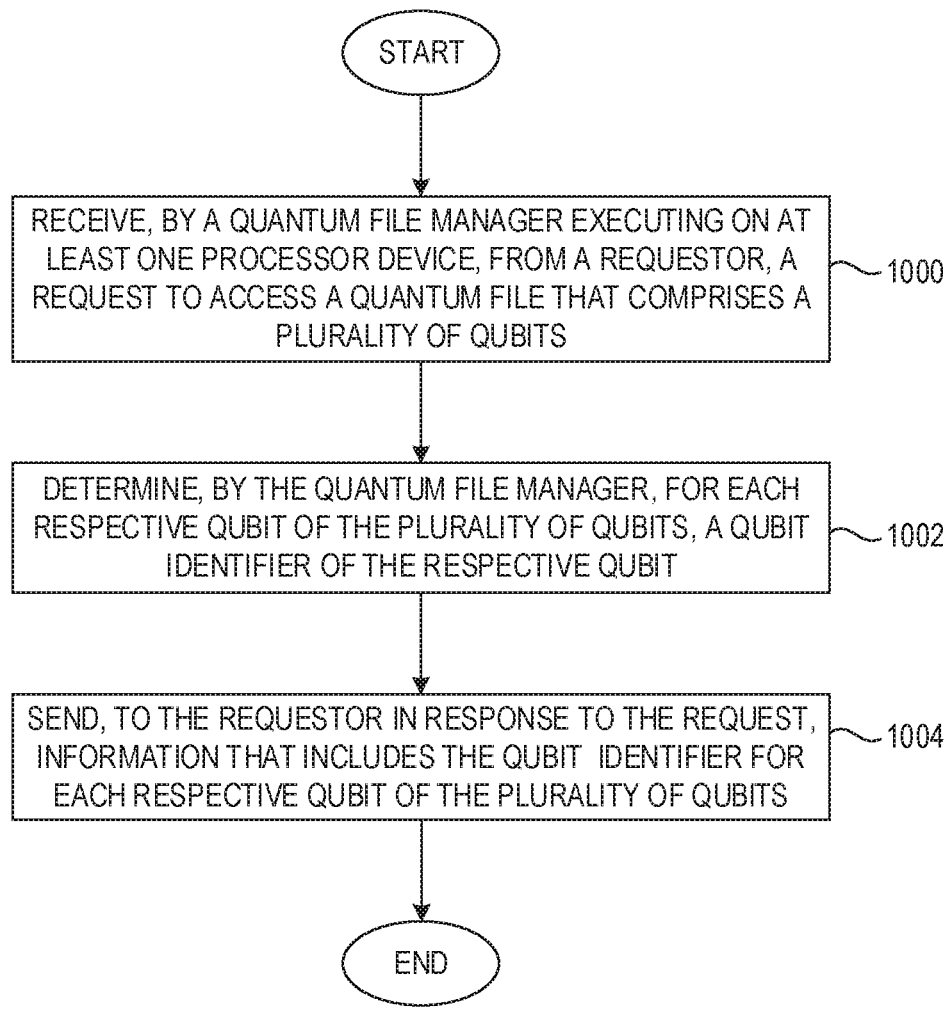
FIG. 2 is a flow chart of a method implemented by a quantum file management system according to one example.

FIG. 2 is a flow chart of a method implemented by a quantum file management system according to one example. FIG. 2 will be discussed in conjunction with FIG. 1. The quantum file manager 20-1, executing on at least one processor device 14, receives, from the quantum application 34, a request to access the quantum file 24 that comprises the qubits 26, 28 (FIG. 2, block 1000). The quantum file manager 20-1 determines, for each respective qubit 26, 28, a qubit identifier of the respective qubit 26, 28 (FIG. 2, block 1002). The quantum file manager 20-1 sends, to the quantum application 34 in response to the request, information that includes the qubit identifier for each of the qubits 26, 28 (FIG. 2, block 1004).

Figure 3:
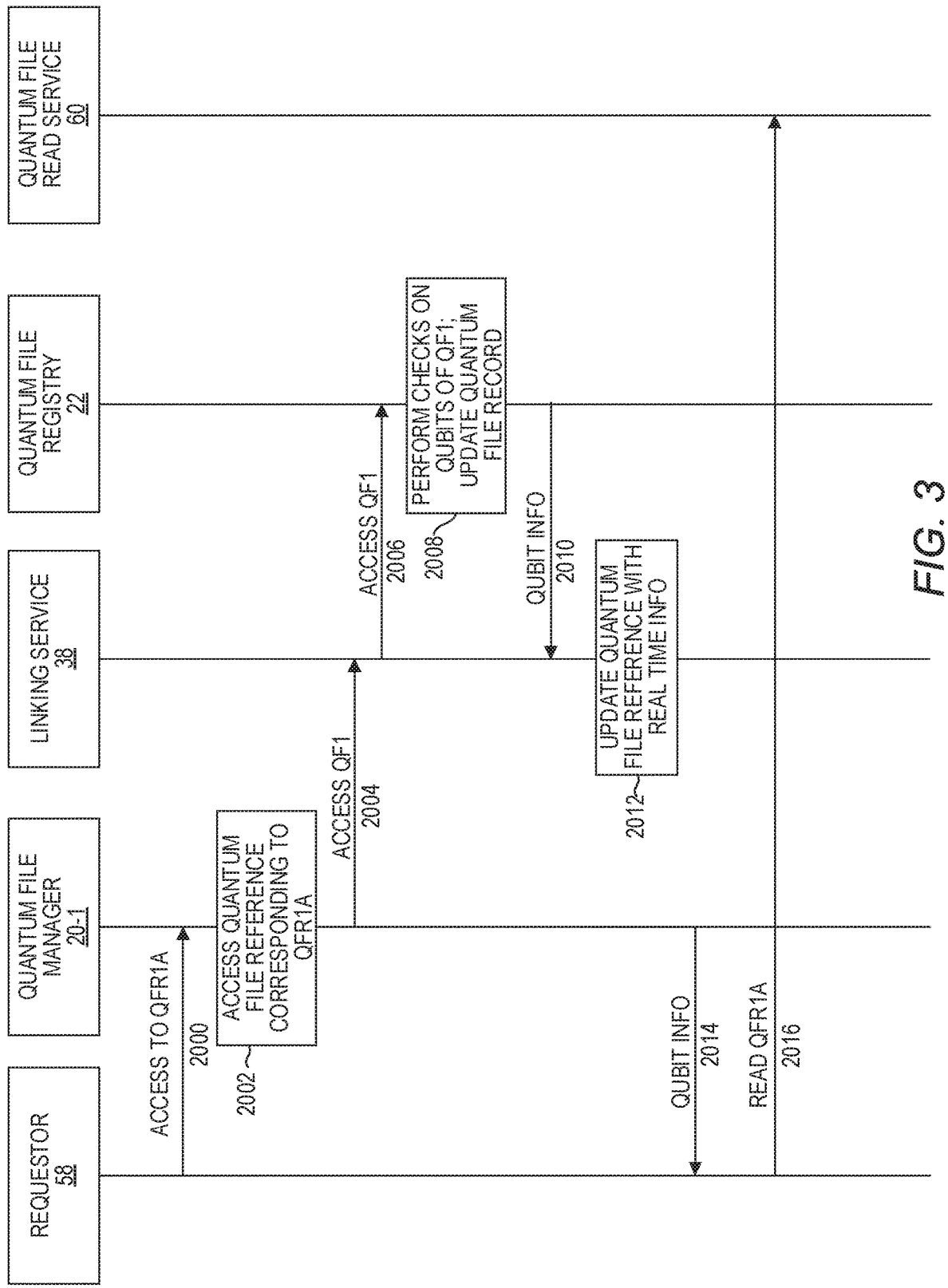
FIG. 3 is a message sequence diagram illustrating messages communicated between components and actions taken by components of a quantum file management system according to one example.

FIG. 3 is a message sequence diagram illustrating messages communicated between components and actions taken by components of the quantum file management system 18 according to one example. A requestor 58, such as, in one example, the quantum application 34, sends an access message to the quantum file manager 20-1 that requests access to the quantum file 24 (FIG. 3, block 2000). The quantum file manager 20-1 accesses the quantum file reference 32-1 that corresponds to the quantum file 24 (FIG. 3, block 2002). The quantum file manager 20-1 requests an update to the quantum file reference 32-1 via the linking service 38 (FIG. 3, block 2004). The linking service 38 sends an access request for the quantum file 24 to the quantum file registry 22 (FIG. 3, block 2006).

The quantum file registry 22 accesses the quantum file record 48-1, which corresponds to the quantum file 24, and performs one or more safety checks on the qubits 26 and 28. The safety checks may include, for example, whether the state of entanglement of the qubits 26 and 28 is an entangled state or a not entangled state (FIG. 3, block 2008). The quantum file registry 22 updates the quantum file record 48-1, as needed, and then sends information about the qubits 26, 28 to the linking service 38 (FIG. 3, block 2010). The information may include, for example, the current qubit identifiers of the qubits 26 and 28, their states of entanglement, and the like. The linking service 38 receives the information and updates the quantum file reference 32-1 with the information (FIG. 3, block 2012). The quantum file manager 20-1 returns to the requestor 58 qubit information, such as the qubit identifiers of the qubits 26 and 28 and their state of entanglement (FIG. 3, block 2014). The requestor 58 may then determine that, based on the qubits 26 and 28 not being in an entangled state, to access the quantum file 24. The requestor 58 may then issue a read request to a quantum file read service 60 (FIG. 3, block 2016).

Figure 4A:
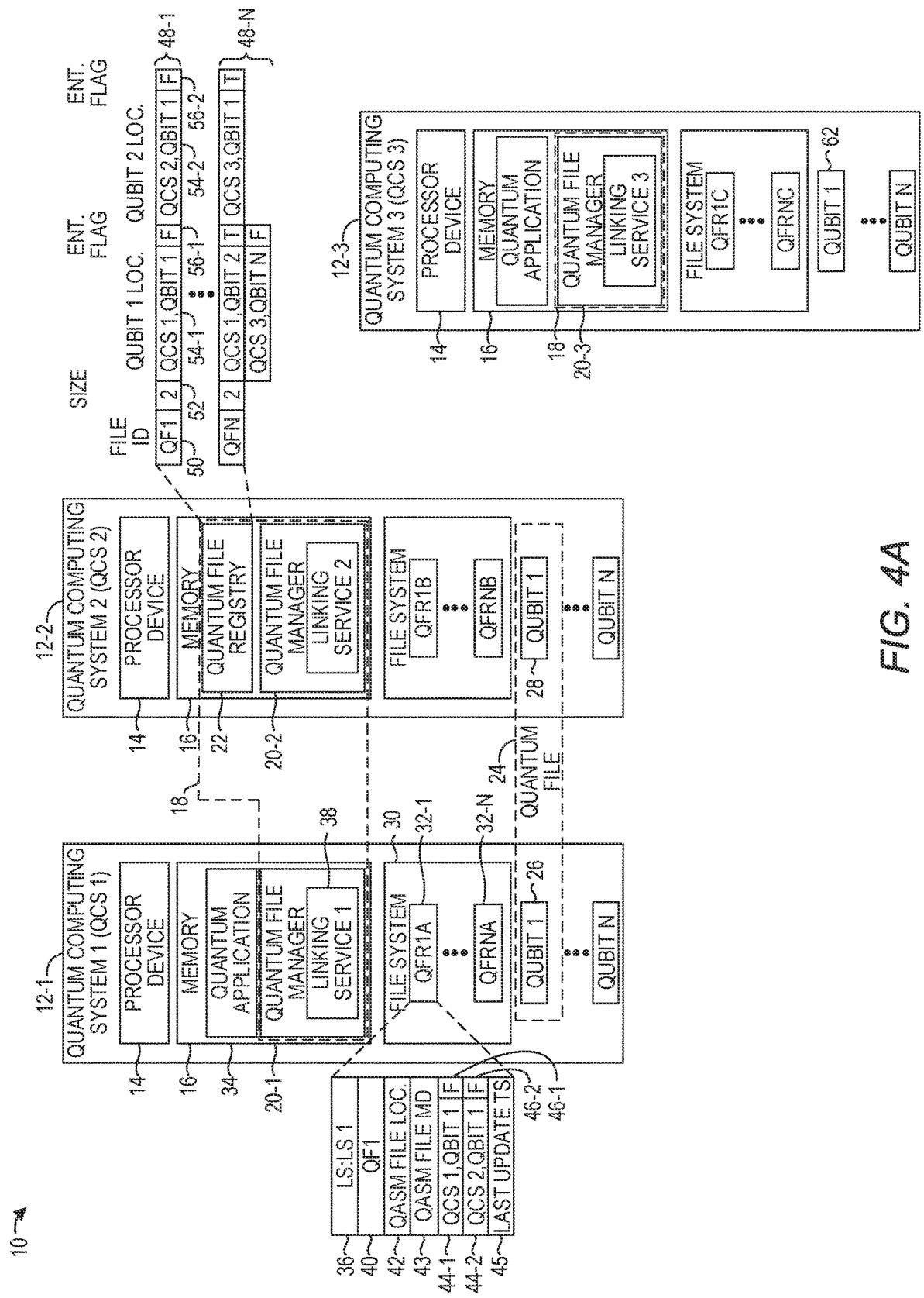
FIG. 4A is a block diagram illustrating the environment illustrated in FIG. 1 before information has been migrated, or copied, from one qubit to another qubit, according to one example.
Figure 4B:
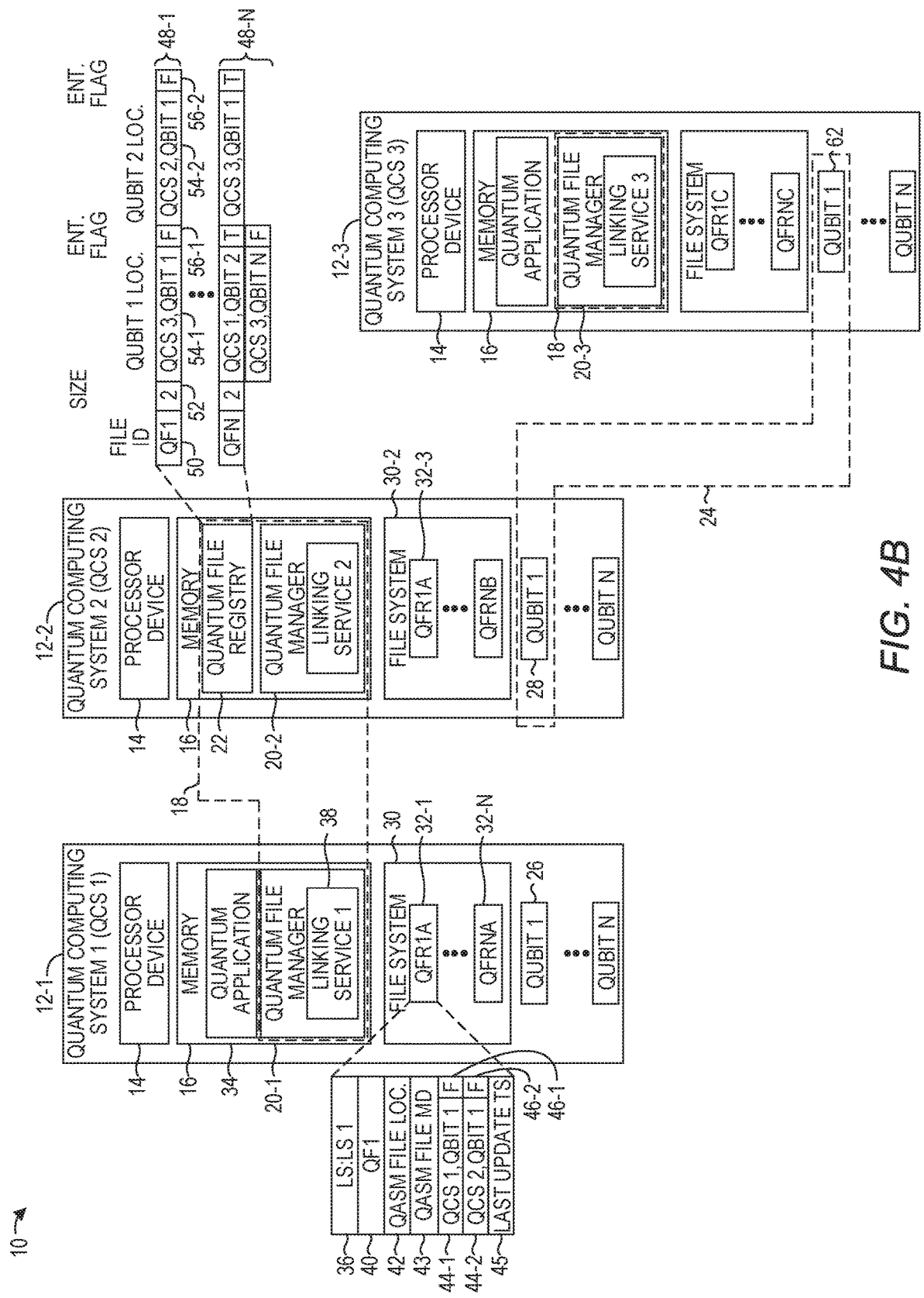
FIG. 4B is a block diagram illustrating the environment after information has been migrated, or copied, from one qubit to another qubit, according to one example.

FIGS. 4A-4B are block diagrams illustrating the environment 10 at two points in time, respectively. FIG. 4A illustrates the environment 10 before information has been migrated, or copied, from one qubit to another qubit, according to one example, and FIG. 4B illustrates the environment 10 after information has been migrated, or copied, from one qubit to another qubit. Referring first to FIG. 4A, the quantum file 24 comprises the qubits 26 and 28, as discussed above with regard to FIGS. 1 and 2. An operator desires to copy the data from the qubit 26 to a qubit 62 implemented on the quantum computing system 12-3. In one example, the operator may interact with the quantum file manager 20-1 to initiate a copy of the data from the qubit 26 to a qubit 62. Referring now to FIG. 4B, the quantum file manager 20-1 initiates a quantum copy process that copies the data from the qubit 26 to the qubit 62. When the copy is complete, the quantum file manager 20-1 sends a message to the quantum file registry 22 indicating that the qubit identifier contained in the qubit identification field 54-1 for the quantum file 24 has changed, and provides the qubit identifier of the qubit 62 to the quantum file registry 22. The quantum file registry 22 updates the qubit identification field 54-1 to reflect the qubit 62. Subsequent accesses of the quantum file 24 by the quantum application 34 will cause the process described in FIG. 3 to occur, and the quantum file reference 32-1 at that time will be updated with the current qubit identifiers that identify the qubit 62 and the qubit 28.

In some implementations, the quantum file management system 18 facilitates copying of a quantum file reference 32 from one quantum computing system 12 to another quantum computing system 12. In this manner, requestors executing on different quantum computing systems 12 can get access to the quantum file 24. In particular, upon a request from an operator for example, the quantum file manager 20-1 interacts with the quantum file manager 20-2 to copy the data from the quantum file reference 32-1 to a quantum file reference 32-3 in a file system 30-2 of the quantum computing system 12-2. After the quantum file reference 32-3 has been created and populated with the data from the quantum file reference 32-1, the quantum file manager 20-1 may delete the quantum file reference 32-1 from the file system 30.

Figure 5A:
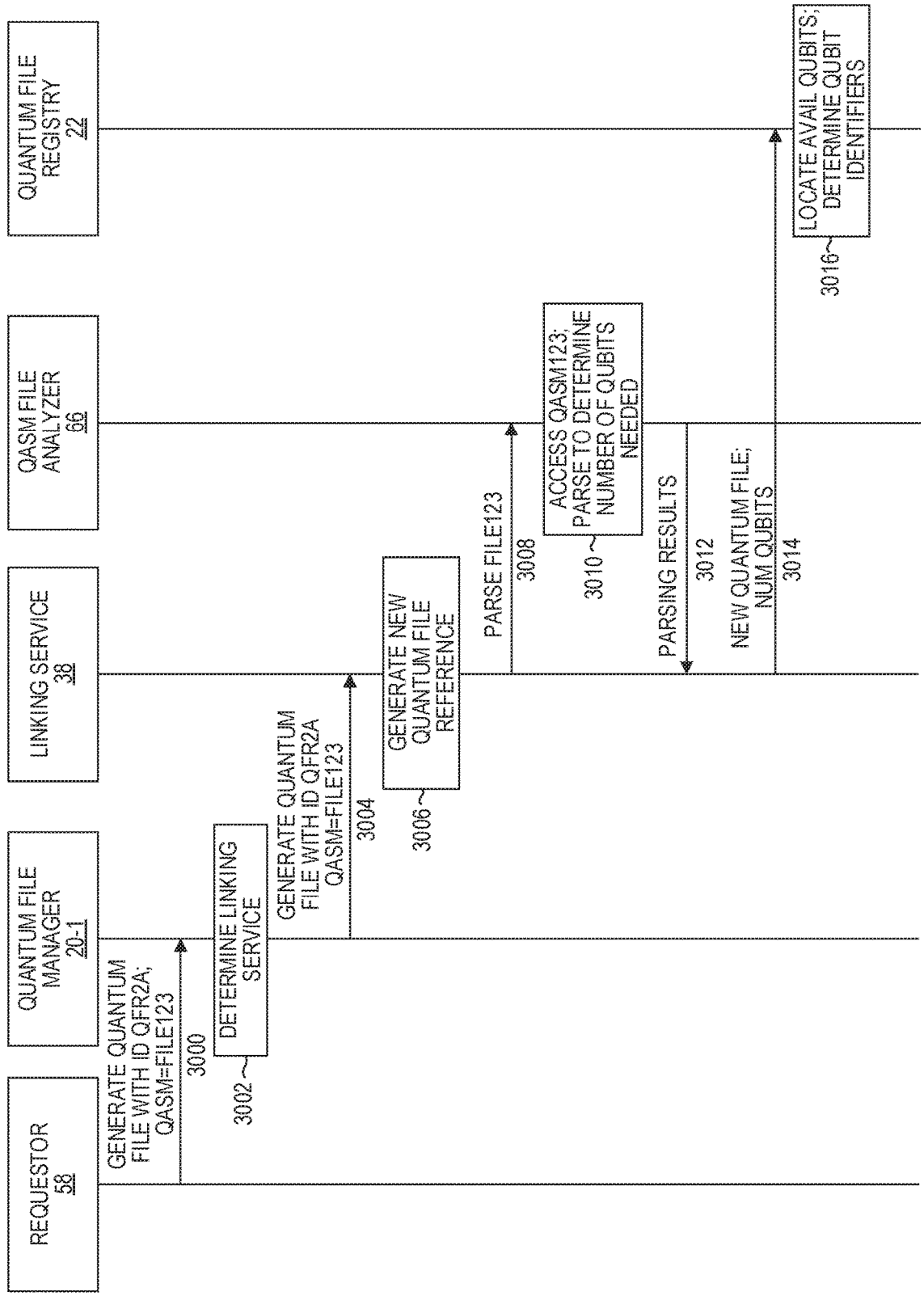
FIGS. 5A-5B are message sequence diagrams illustrating a sequence of messages between components and actions taken by such components to generate a quantum file, in accordance with one example.
Figure 5B:
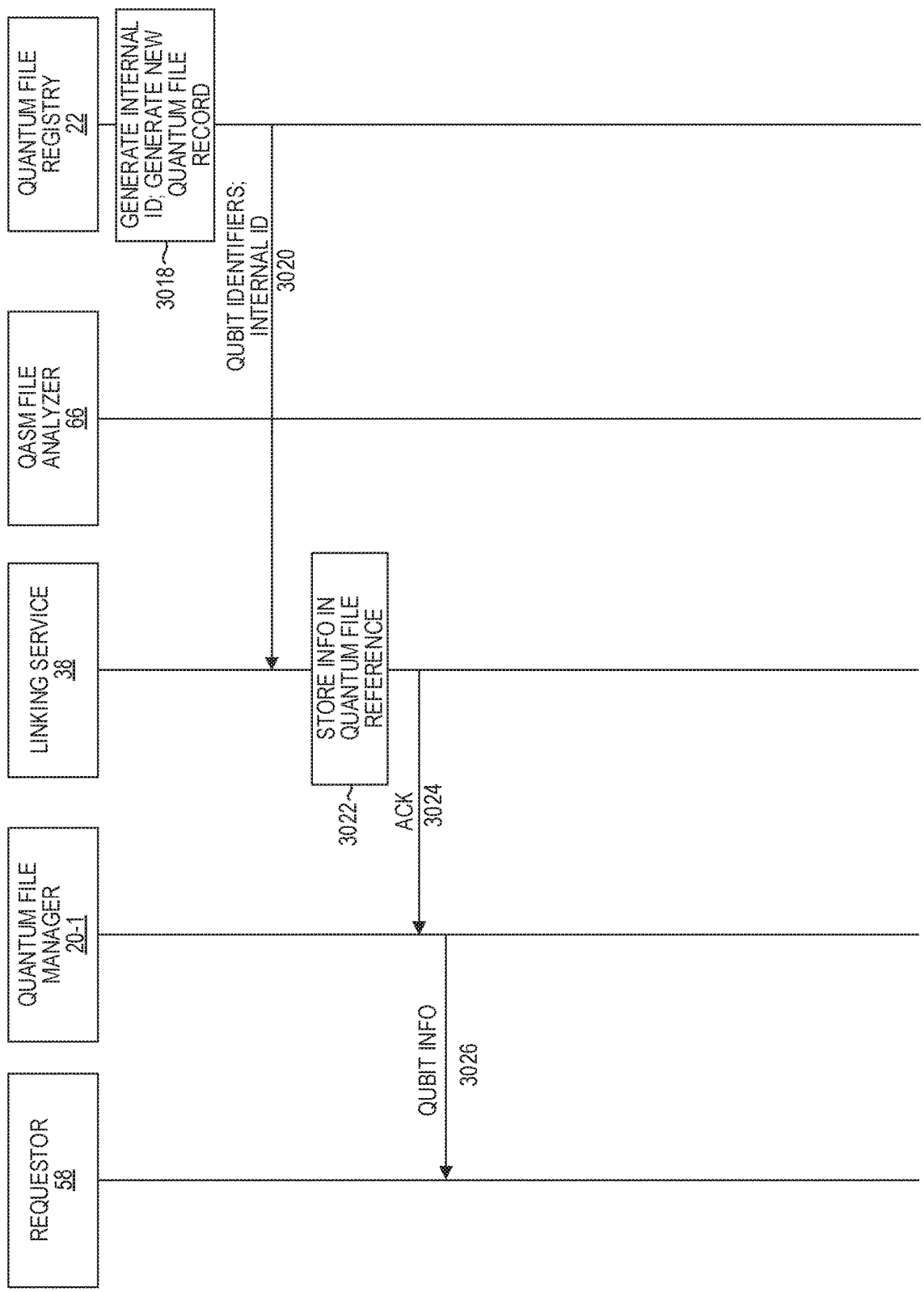

FIGS. 5A-5B are message sequence diagrams illustrating a sequence of messages between components and actions taken by such components to generate a quantum file, in accordance with one example. In this example, quantum file references are maintained as classical, rather than quantum, data. Assume that the requestor 58 desires to generate a new quantum file that is based on an existing QASM file. The requestor 58 may be, by way of non-limiting example, an operator that interacts with a quantum file generation user interface, or an application executing on the quantum computing system 12-1. The request includes a desired external file identifier, in this case "QFR2A", and an identifier of the respective QASM file. The requestor 58 sends the request to the quantum file manager 20-1 (FIG. 5A, block 3000). The quantum file manager 20-1 receives the request, and determines an appropriate linking service to be associated with the new quantum file (FIG. 5A, block 3002). The selection of the linking service may be based on any desired factors or algorithms. In some examples, each quantum computing system 12-1-12-3 may have a single linking service, and the linking service of the respective quantum computing system 12-1-12-3 may be selected for any quantum files generated on the respective quantum computing system 12-1-12-3. In other examples, a quantum computing system 12 may have multiple linking services, and a selection algorithm, such as, by way of non-limiting example, a round-robin selection algorithm, may be used to select a particular linking service. In some examples, the linking service of the quantum computing system 12-1-12-3 that implements a majority of the qubits of the new quantum file may be selected.

Note that the linking service for a quantum file may change over time. For example, if a quantum file reference is moved from one quantum computing system 12 to another quantum computing system 12, as discussed with regard to FIG. 4B for example, the linking service identified in the quantum file reference may be revised to identify a different linking service, such as the linking service that executes on the quantum computing system to which the quantum file reference was moved.

In this example, the quantum file manager 20-1 selects the linking service 38 as the appropriate linking service to be associated with the quantum file. The quantum file manager 20-1 communicates the information received from the requestor 58 to the linking service 38 (FIG. 5A, block 3004). The linking service 38 generates a new quantum file reference (FIG. 5A, block 3006). The linking service 38 sends a parsing request to a QASM file analyzer 66, requesting that the QASM file FILE123 be analyzed to determine a number of qubits needed to execute the QASM file FILE123 (FIG. 5A, block 3008). The QASM file analyzer 66 accesses the QASM file FILE123, and parses the programming instructions in the QASM file FILE123 (FIG. 5A, block 3010). For purposes of illustration, assume that the QASM file analyzer 66 determines that three qubits are needed during the execution of the QASM file FILE123. The QASM file analyzer 66 sends the results of the analysis to the linking service 38 (FIG. 5A, block 3012).

The linking service 38 sends a quantum file creation request to the quantum file registry 22, and provides the number of qubits needed (FIG. 5A, block 3014). The quantum file registry 22 locates three available qubits on the quantum computing systems 12-1-12-3 (FIG. 5A, block 3016). Referring now to FIG. 5B, the quantum file registry 22 generates a new internal file identifier, and stores the new internal file identifier and the qubit identifiers of the three available qubits in a new quantum file record (FIG. 5B, block 3018). The quantum file registry 22 sends the qubit identifiers and the internal identifier to the linking service 38 (FIG. 5B, block 3020). The linking service 38 stores the information in the new quantum file reference (FIG. 5B, block 3022). The linking service 38 informs the quantum file manager 20-1 that the quantum file reference for the file ID QFR2A has been generated (FIG. 5B, block 3024). The quantum file manager 20-1 provides the qubit information to the requestor 58 (FIG. 5B, block 3026).

Figure 6A:
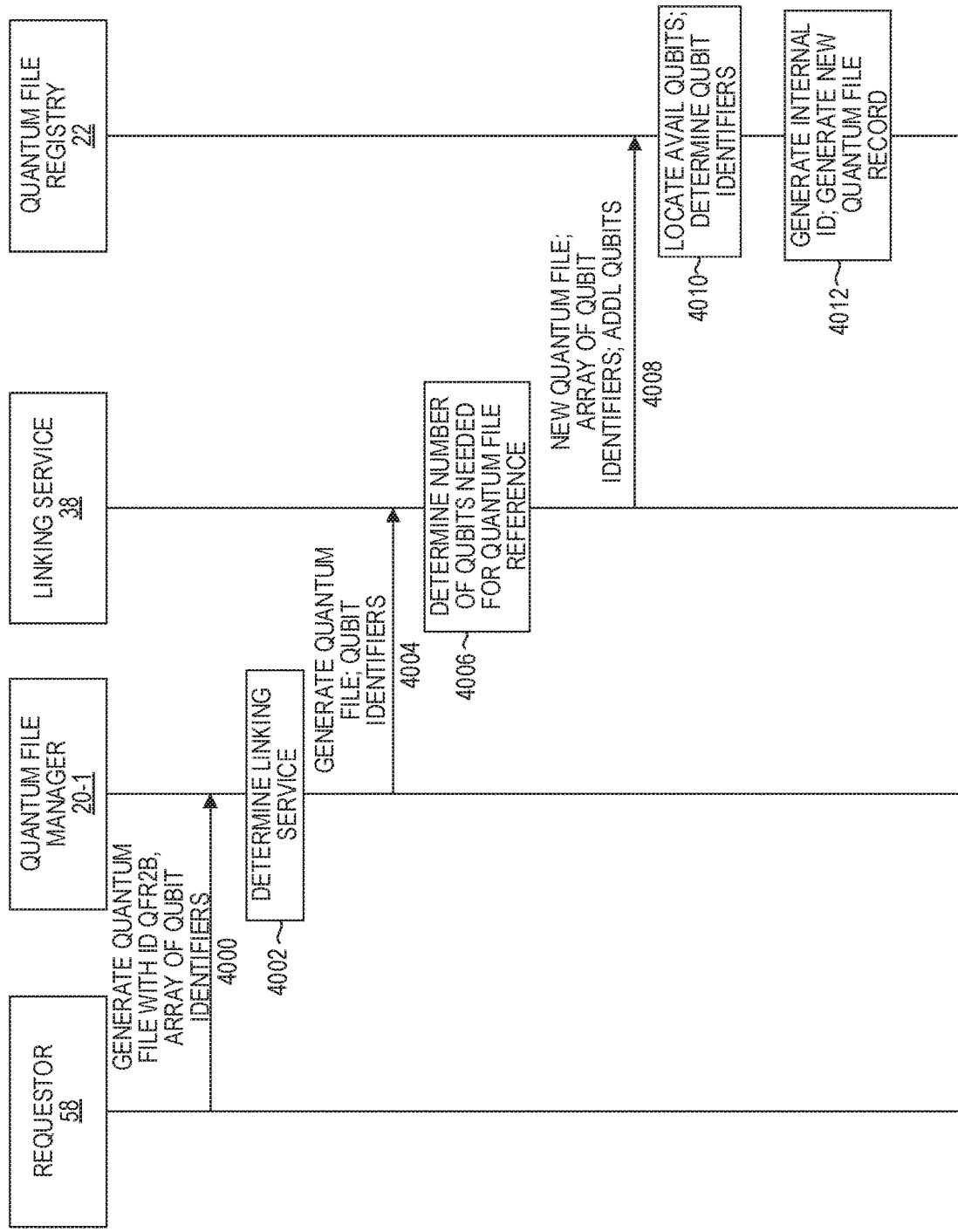
FIGS. 6A-6B are message sequence diagrams illustrating a sequence of messages between components and actions taken by such components to generate a quantum file, in accordance with another example.
Figure 6B:
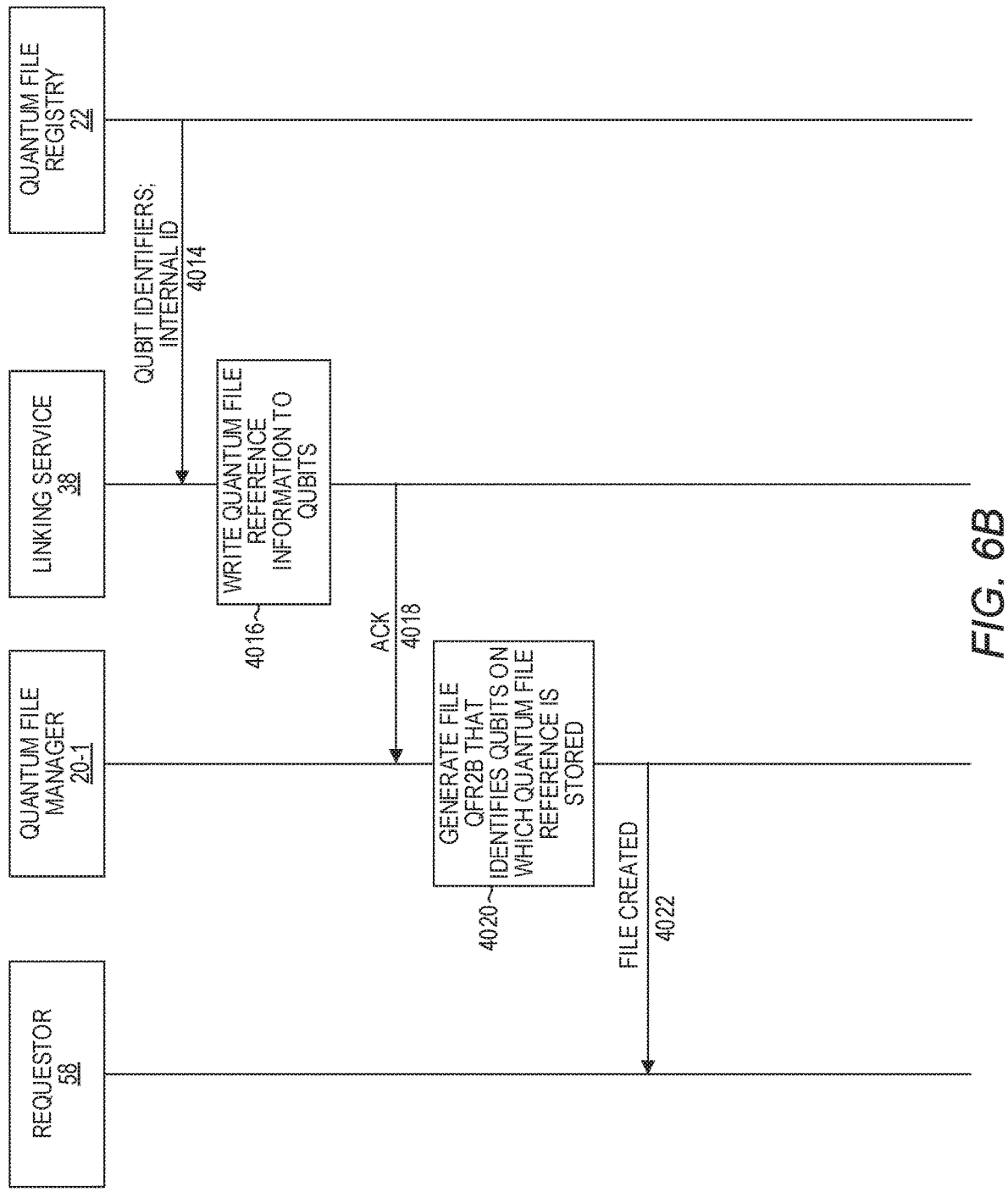

FIGS. 6A-6B are message sequence diagrams illustrating a sequence of messages between components and actions taken by such components to generate a quantum file, in accordance with another example. In this example, quantum file references are maintained as quantum, rather than classical, data. Assume that the requestor 58 desires to generate a new quantum file. Again, the requestor 58 may be, by way of non-limiting example, an operator that interacts with a quantum file generation user interface, or an application executing on the quantum computing system 12-1. The request includes a desired external file identifier, in this case "QFR2B", and a list of qubit identifiers to be used for the file. The requestor 58 sends the request to the quantum file manager 20-1 (FIG. 6A, block 4000).

The quantum file manager 20-1 receives the request, and determines an appropriate linking service to be associated with the new quantum file (FIG. 6A, block 4002). In this example, the quantum file manager 20-1 selects the linking service 38 as the appropriate linking service to be associated with the quantum file. The quantum file manager 20-1 communicates the information received from the requestor 58 to the linking service 38 (FIG. 6A, block 4004). The linking service 38 analyzes the request, and the number of qubits identified in the array of qubit identifiers, and determines a number of qubits that will be needed to store a new quantum file reference (FIG. 6A, block 4006). The linking service 38 sends a quantum file creation request to the quantum file registry 22, and provides the number of qubits needed for the quantum file reference, and the array of qubit identifiers (FIG. 6A, block 4008). The quantum file registry 22 locates the number of requested qubits on the quantum computing systems 12-1-12-3 for the quantum file reference (FIG. 6A, block 4010). The quantum file registry 22 generates a new internal file identifier, and stores the new internal file identifier and the qubit identifiers identified in the array of qubit identifiers (FIG. 6A, block 4012).

Referring now to FIG. 6B, the quantum file registry 22 sends the qubit identifiers for the quantum file reference and the internal identifier to the linking service 38 (FIG. 6B, block 4014). The linking service 38 then stores the information for the new quantum file reference across the qubits identified by the quantum file registry 22 (FIG. 6B, block 4016). The linking service 38 informs the quantum file manager 20-1 that the quantum file reference for the file ID QFR2B has been generated (FIG. 6B, block 4018). The quantum file manager 20-1 generates a classic file entitled QFR2B that identifies the qubits on which the new quantum file reference has been stored (FIG. 6B, block 4020). The quantum file manager 20-1 sends a message to the requestor 58 that the file QFR2B has been created (FIG. 6B, block 4022).

Figure 7A:
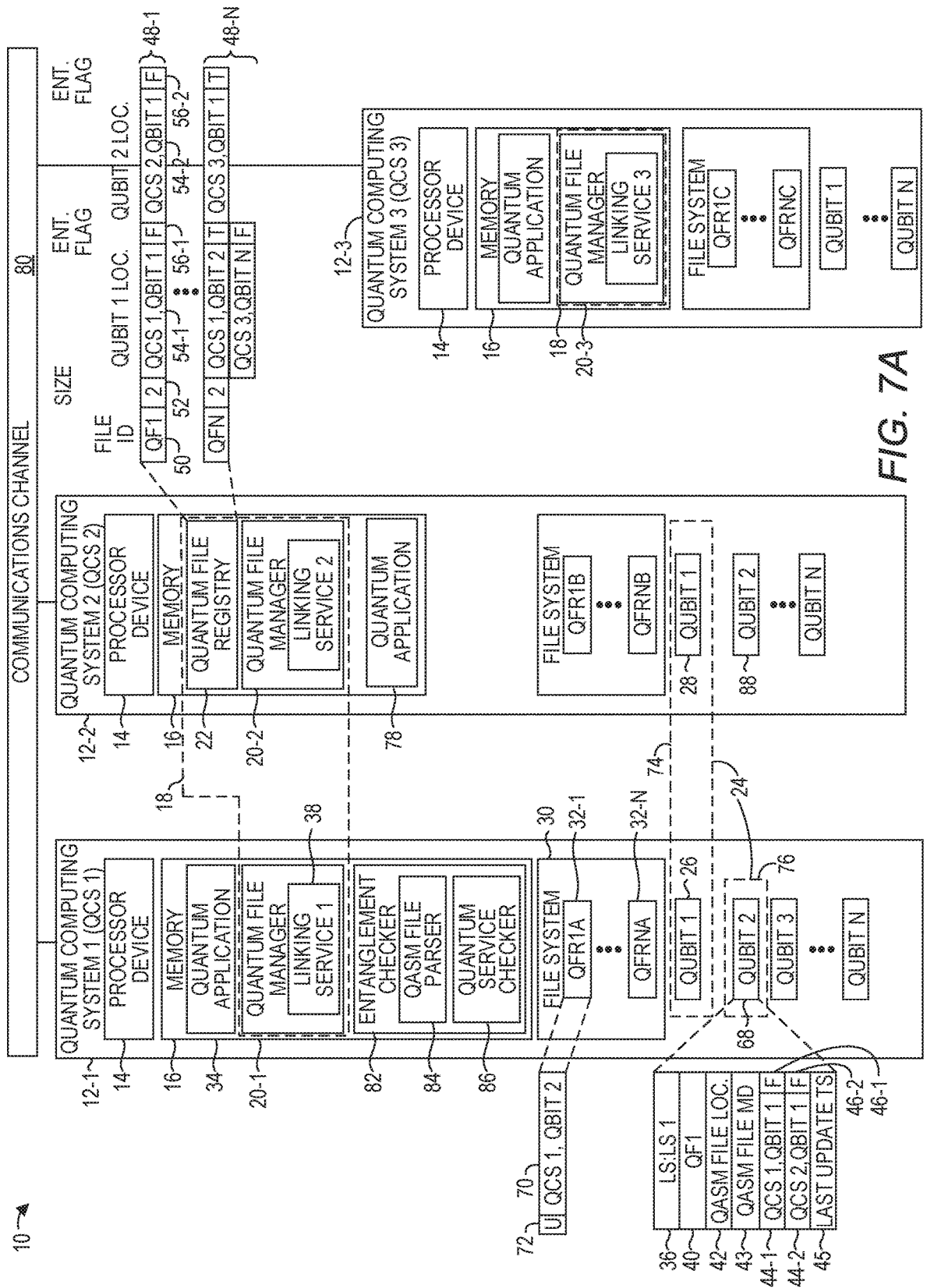
FIGS. 7A-7B are block diagrams of the environment illustrated in FIG. 1 according to another example at different points in time.
Figure 7B:
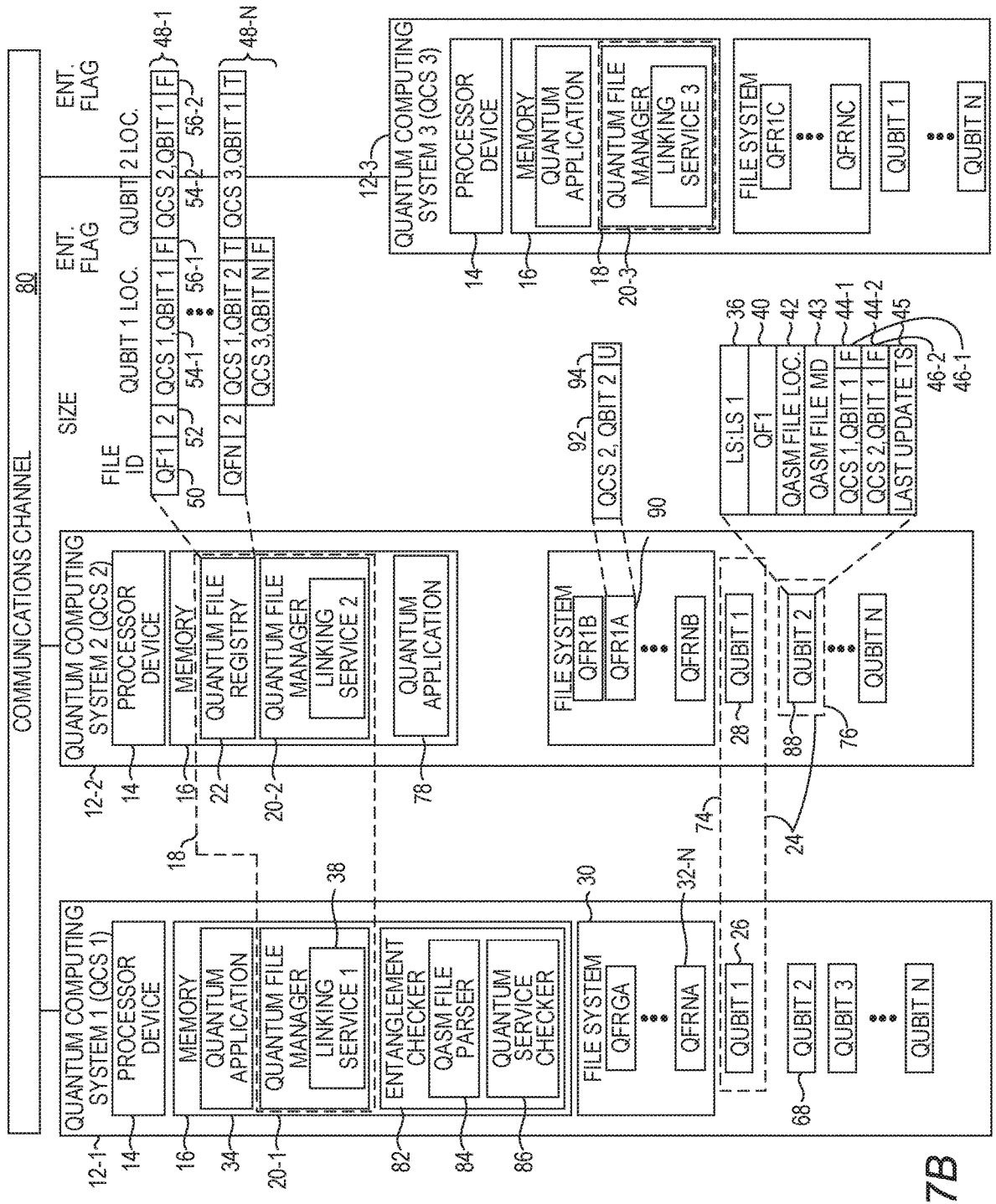

FIGS. 7A-7B are block diagrams of the environment 10 according to another example at different points in time. Referring first to FIG. 7A, in this example, similar to that discussed above with regard to FIGS. 6A-6B, the metadata of the quantum file 24, previously described as being stored in the quantum file reference 32-1, is actually stored in a qubit 68 implemented on the quantum computing system 12-1. The quantum file reference 32-1 contains qubit header information 70 that identifies the qubit in which the metadata is stored, and, in some examples, includes a locked status field 72 that indicates whether or not the quantum file 24 may be accessed by an application executing on the quantum computing system 12-1. The locked status field 72 may comprise a "U" to indicate the quantum file 24 is unlocked, and therefor available, or an "L" to indicate the quantum file 24 is locked, and therefor unavailable.

The quantum file 24 contains a qubit data portion 74 which is stored on the qubits 26 and 28, and a qubit header portion 76 which is stored on the qubit 68. A quantum file "resides on" or is "owned by" the quantum computing system 12 that implements the qubits on which the qubit header portion 76 is implemented. Thus, in this example, the quantum file 24 resides on the quantum computing system 12-1 because the quantum computing system 12-1 implements the qubit header portion 76 on the qubit 68. It should be noted that although the qubit header portion 76 is implemented on a single qubit 68, for other quantum files, a qubit header portion may span multiple qubits.

Ownership of the quantum file 24 may limit access to the quantum file 24 to quantum applications that execute on the quantum computing system 12-1. Thus, if a quantum application 78 executing on the quantum computing system 12-2 desires access to the quantum file 24, the quantum file 24 may first need to be migrated from the quantum computing system 12-1 to the quantum computing system 12-2.

In one example the quantum computing systems 12-1-12-3 communicate quantum file information among the quantum computing systems 12-1-12-3 via a communications channel 80, which may, for example, comprise a publish/subscribe communication channel. The information published may include, for example, the creation of new quantum files, the deletion of quantum files, changes in quantum files, and the like. The quantum computing systems 12-1-12-3 may also publish requests via the communications channel 80. In this example, the quantum application 78 may publish a request for the quantum file 24. The quantum computing system 12-1 may receive the request and make a determination as to whether the quantum computing system 12-1 can respond to the request. For example, the quantum file 24 may have security attributes that prohibit certain users from accessing the quantum file 24, or that permit access by designated users, or the like. The quantum computing system 12-1 determines that the quantum computing system 12-1 can respond to the request, and publishes a response indicating that the quantum file 24 resides on the quantum computing system 12-1.

The quantum computing system 12-1 receives a request to provide the quantum file 24 to the quantum computing system 12-2. The request may come, for example, from the quantum computing system 12-1, via an operator user interface executing on the quantum computing system 12-1, or any other suitable source. In response to the request, the quantum computing system 12-1 may initially determine whether or not any of the qubits 26, 28 or 68 are entangled, and therefore in a state where access should at least temporarily be denied.

In one implementation, an entanglement checker 82 includes a QASM file parser 84 and a quantum service checker 86. The QASM file parser 84 parses QASM files that access qubits, either directly or via a quantum file. The QASM file parser 84 identifies assembly instructions that cause a qubit to be entangled. The QASM file parser 84 may then store this information in a table. The quantum service checker 86 uses the table to determine what service may utilize a particular qubit. In this example, the quantum service checker 86 may access the table and determine, for example, that a Service A utilizes the quantum file 24. The quantum service checker 86 determines that the Service A is not currently executing. The quantum service checker 86 therefore determines that the qubits 26, 28 and 68 are not currently entangled, and that the quantum file 24 can be safely moved to the quantum computing system 12-2.

The quantum computing system 12-1 may have different mechanisms for moving the qubit header portion 76 from the quantum computing system 12-1 to the quantum computing system 12-2. As an example, the quantum computing system 12-1 may establish a quantum channel with the quantum computing system 12-2 and communicate the quantum data stored in the qubit 68 to a qubit 88 of the quantum computing system 12-2. Alternatively, the quantum computing system 12-1 may be able to set up and initiate a quantum teleportation of the quantum data stored in the qubit 68 to the qubit 88.

The quantum computing system 12-1 and the quantum computing system 12-2 may engage in a series of communications to establish a preferred mechanism for moving the qubit header portion 76 from the quantum computing system 12-1 to the quantum computing system 12-2. For example, if a quantum communication channel already exists between the quantum computing system 12-1 and the quantum computing system 12-2, the quantum computing system 12-2 may request that the qubit header portion 76 be moved from the quantum computing system 12-1 to the quantum computing system 12-2 via the quantum communication channel. Alternatively, if the quantum computing system 12-2 implements a sufficient number of qubits that are available for use and can be used in a teleportation operation, the quantum computing system 12-2 may request that the qubit header portion 76 be moved from the quantum computing system 12-1 to the quantum computing system 12-2 via the quantum communication channel.

The quantum computing system 12-1 determines a particular qubit header move operation is preferred, and utilizes the particular qubit header move operation, in conjunction with the quantum computing system 12-2, to move the qubit header portion 76 from the qubit 68 to a qubit implemented on the quantum computing system 12-2, such as the qubit 88.

Referring now to FIG. 7B, the quantum file 24 has been moved to the quantum computing system 12-2. The quantum computing system 12-1 alters data associated with the quantum computing system 12-1 to indicate that the quantum file 24 no longer resides on the quantum computing system 12-1. In particular, in this example, the quantum computing system 12-1 removes the quantum file reference 32-1 from the file system 30 to indicate that the quantum file 24 no longer resides on the quantum computing system 12-1. The quantum computing system 12-2 alters data associated with the quantum computing system 12-2 to indicate that the quantum file 24 now resides on the quantum computing system 12-2. In particular, in this example, the quantum computing system 12-2 has added a file reference 90 that corresponds to the quantum file 24, and that contains qubit header information 92 that identifies the qubit 88 in which the metadata is stored, and includes a locked status field 94 that indicates that the quantum file 24 may be accessed by an application executing on the quantum computing system 12-2. Note that the qubit data portion 74 has not moved, and continues to be stored in the qubits 26 and 28. The quantum application 78 may now access the quantum file 24.

The quantum computing system 12-1 or the quantum computing system 12-2 may distribute, via the communications channel 80, an update message that indicates that the quantum file 24 now resides on the quantum computing system 12-2.

Figure 8:
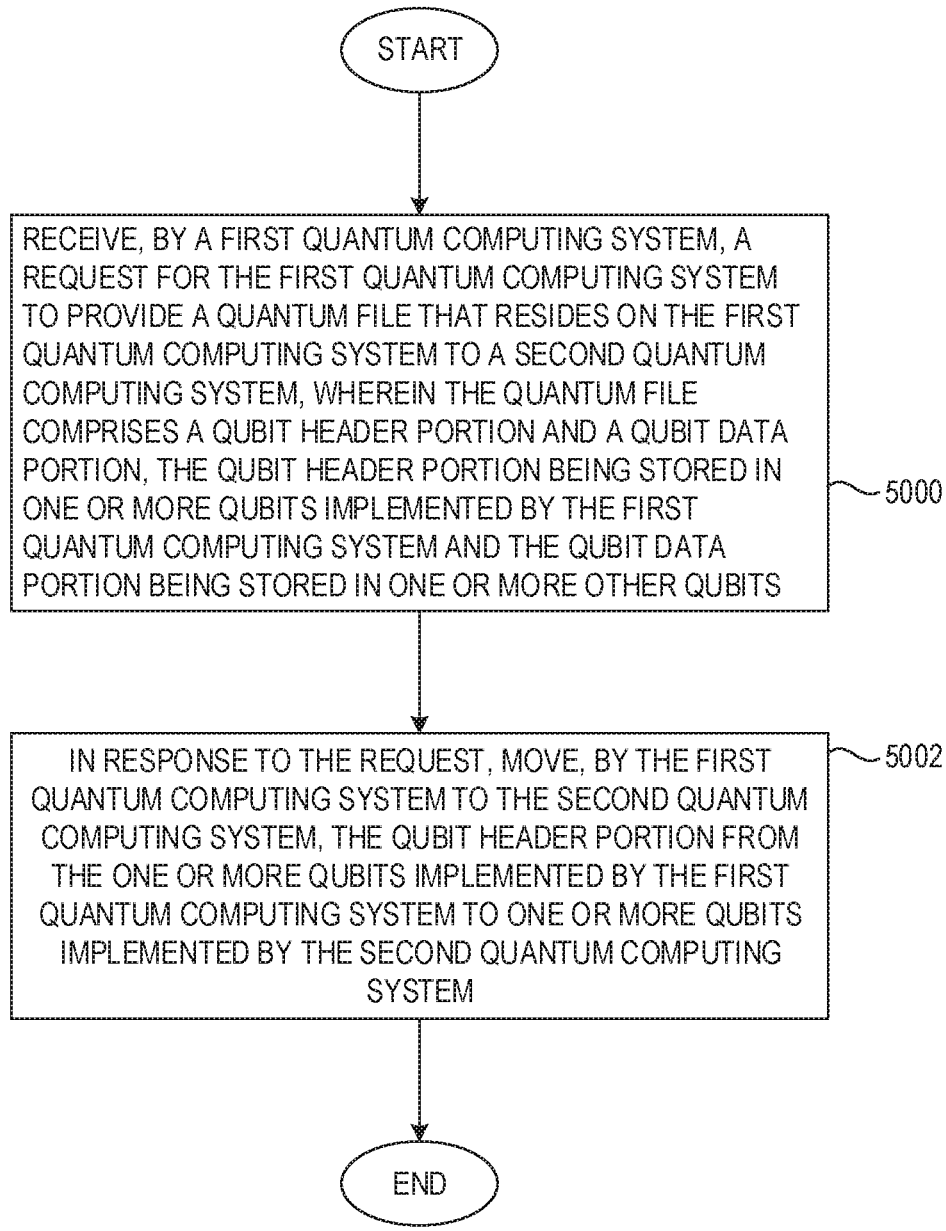
FIG. 8 is a flow chart of a method for migrating a quantum file from one quantum computing system to another quantum computing system according to one example.

FIG. 8 is a flow chart of a method for migrating the quantum file 24 from the quantum computing system 12-1 to the quantum computing system 12-2 according to one example. FIG. 8 will be discussed in conjunction with FIGS. 7A-7B. The quantum computing system 12-1 receives a request for the quantum computing system 12-1 to provide the quantum file 24 that resides on the quantum computing system 12-1 to the quantum computing system 12-2. The quantum file 24 comprises the qubit header portion 76 and the qubit data portion 74, the qubit header portion 76 being stored in the qubit 68 implemented by the quantum computing system 12-1 and the qubit data portion 74 being stored in the qubit 26 and the qubit 28 (FIG. 8, block 5000). In response to the request, the quantum computing system 12-1 moves, to the quantum computing system 12-2, the qubit header portion 76 from the qubit 68 implemented by the quantum computing system 12-1 to the qubit 88 implemented by the quantum computing system 12-2 (FIG. 8, block 5002).

Figure 9A:
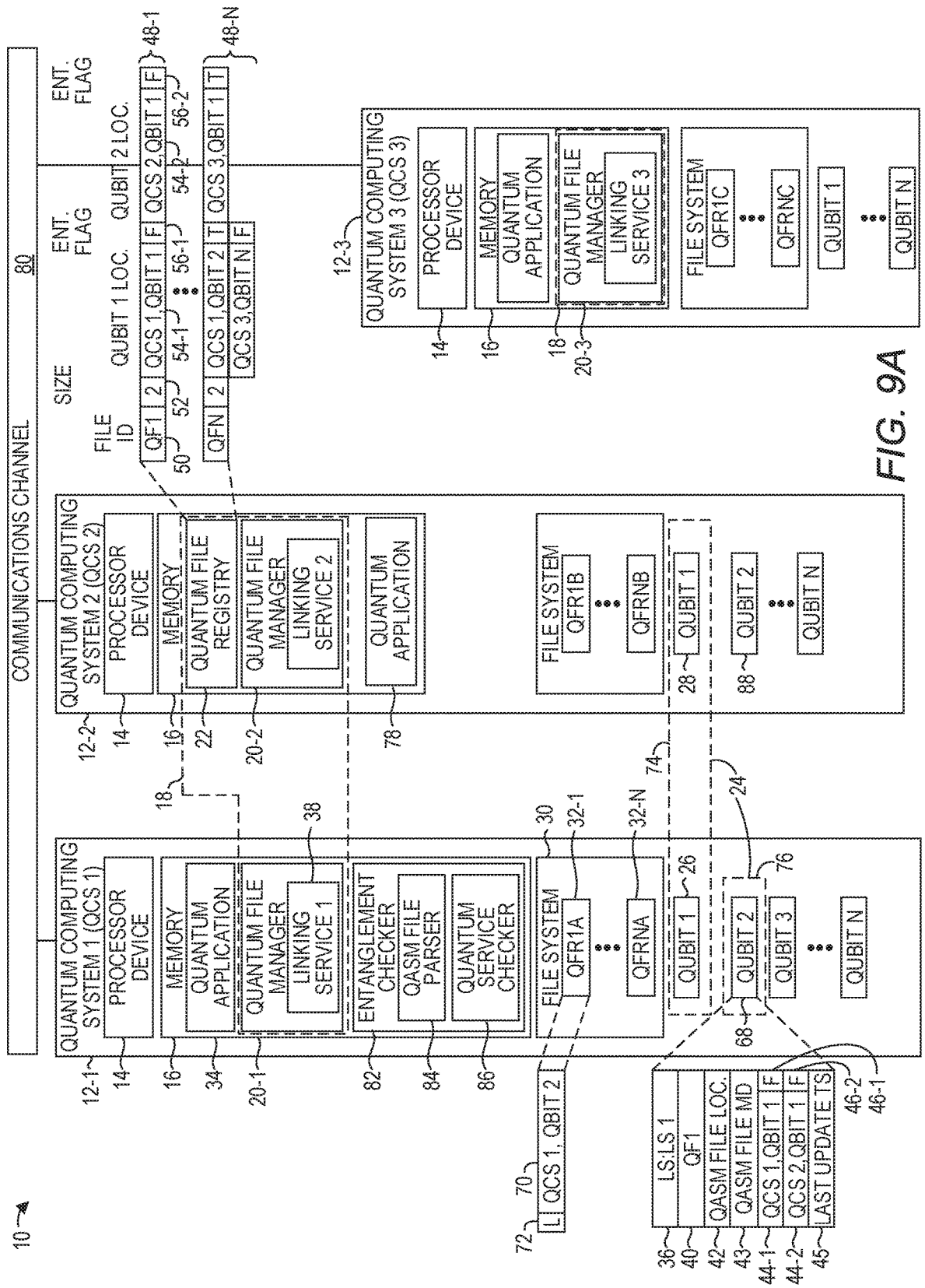
FIGS. 9A-9C are block diagrams of the environment illustrated in FIGS. 7A-7B at different points in time in accordance with a temporary migration of a quantum file according to one example.
Figure 9B:
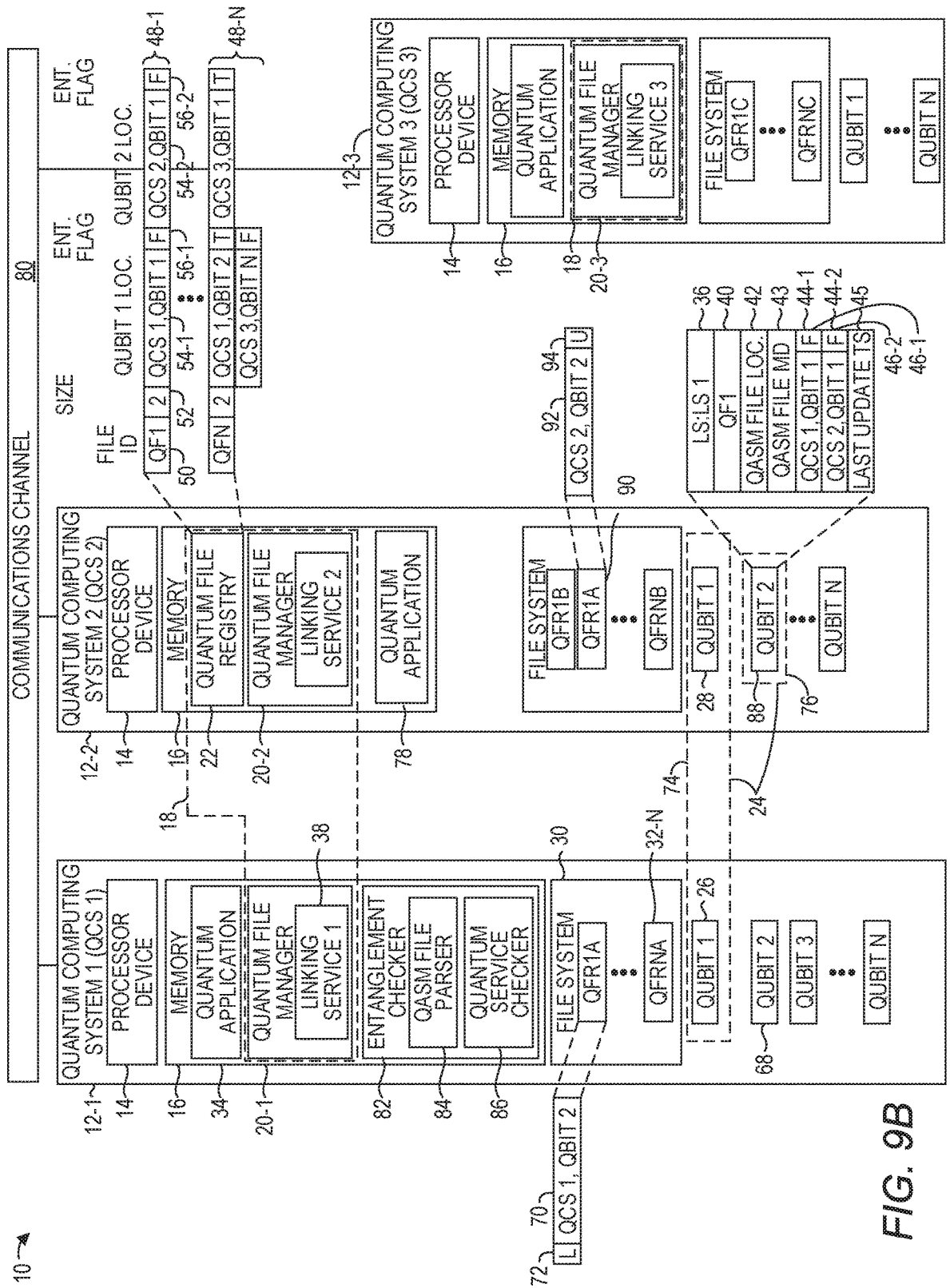
Figure 9C:
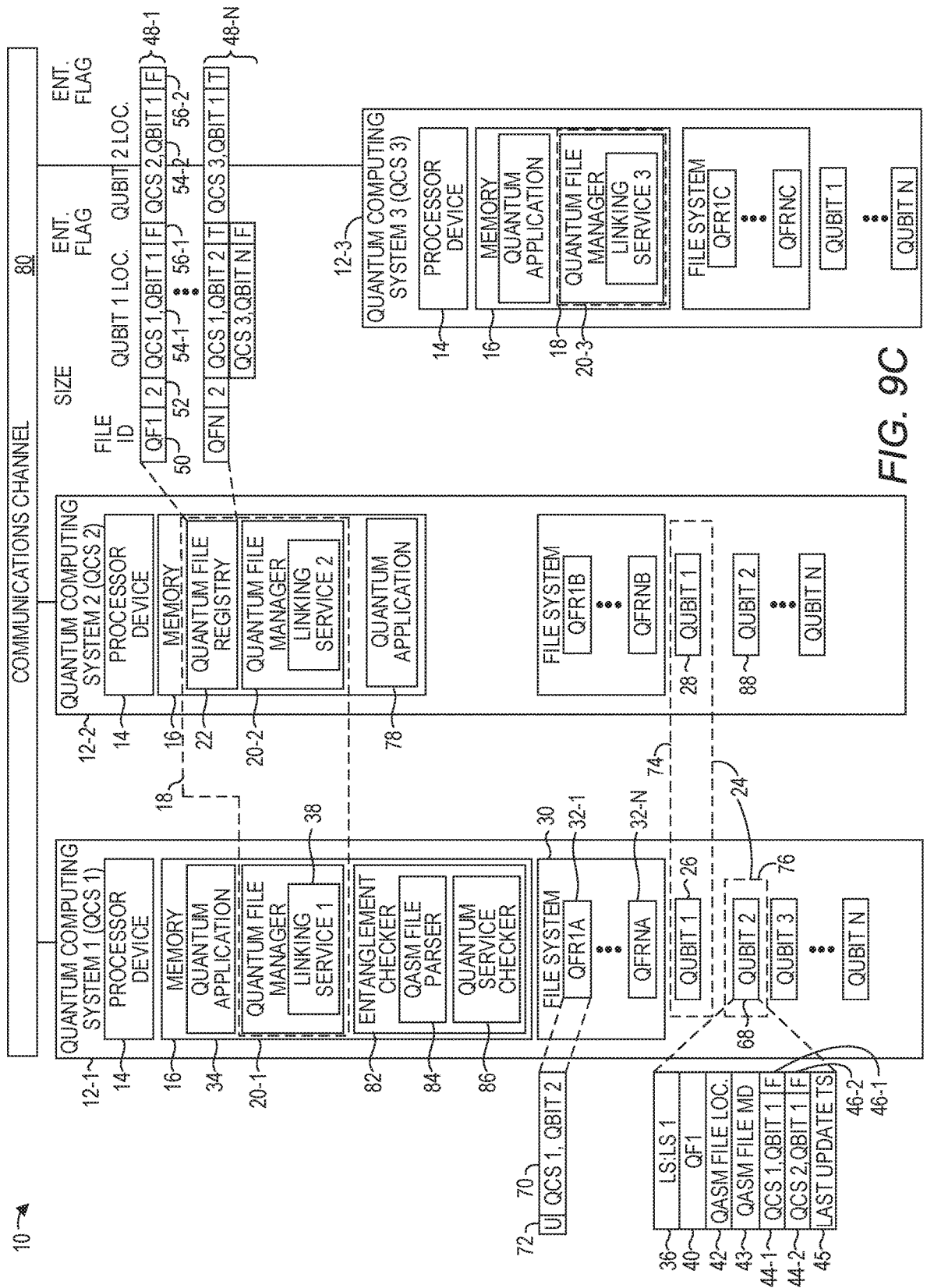

FIGS. 9A-9C are block diagrams of the environment 10 illustrated in FIGS. 7A-7B at different points in time in accordance with a temporary migration of the quantum file 24 according to one example. In this example, the request for the quantum file 24 includes a temporary indicator indicating that the quantum file 24 will subsequently be returned to the quantum computing system 12-1 by the quantum computing system 12-2. Assume, as discussed above with regard to FIGS. 7A-7B, the quantum computing system 12-1 determines that the quantum file 24 can be safely migrated to the quantum computing system 12-2. The quantum computing system 12-1 alters data associated with the quantum computing system 12-1 that indicates that the quantum file is currently unavailable. In particular, in this example, the quantum computing system 12-1 sets the locked status field 72 to locked ("L"). The quantum computing system 12-1 and the quantum computing system 12-2 may then cause the migration of the quantum file 24 from the quantum computing system 12-1 to the quantum computing system 12-2, as discussed above with regard to FIGS. 7A-7B. If any quantum service/application on the quantum computing system 12-1 attempts to access the quantum file 24, access will be denied based on the locked status field 72 having a value of locked ("L").

Referring now to FIG. 9B, the quantum file 24 now resides on the quantum computing system 12-2. The quantum application 78 may access the quantum file 24. After the quantum application 78 completes, the quantum computing system 12-2 sends to the quantum computing system 12-1 a message indicating that the quantum file 24 is to be migrated back to the quantum computing system 12-1. The quantum computing system 12-1 receives the message indicating that the quantum file 24 is to be migrated back to the quantum computing system 12-1, and identifies an available qubit implemented on the quantum computing system 12-1. In this example, it will be assumed that the qubit 68 is identified as an available qubit. The quantum computing system 12-1 and the quantum computing system 12-2 engage in communications to determine a preferred mechanism for moving the qubit header portion 76 stored in the qubit 88 from the quantum computing system 12-2 to the quantum computing system 12-1. The quantum computing system 12-2 and the quantum computing system 12-1 cause the qubit header portion 76 stored in the qubit 88 to be stored in the qubit 68 in accordance with the preferred mechanism.

Referring now to FIG. 9C, the quantum computing system 12-1 alters the data associated with the quantum computing system 12-1 that indicates that the quantum file 24 is currently unavailable to indicate that the quantum file 24 is available. In particular, in this example, the quantum computing system 12-1 sets the locked status field 72 to locked ("U"). The quantum computing system 12-2 removes the file reference 90 from the file system to indicate that the quantum file 24 no longer resides on the quantum computing system 12-2.

Figure 10:
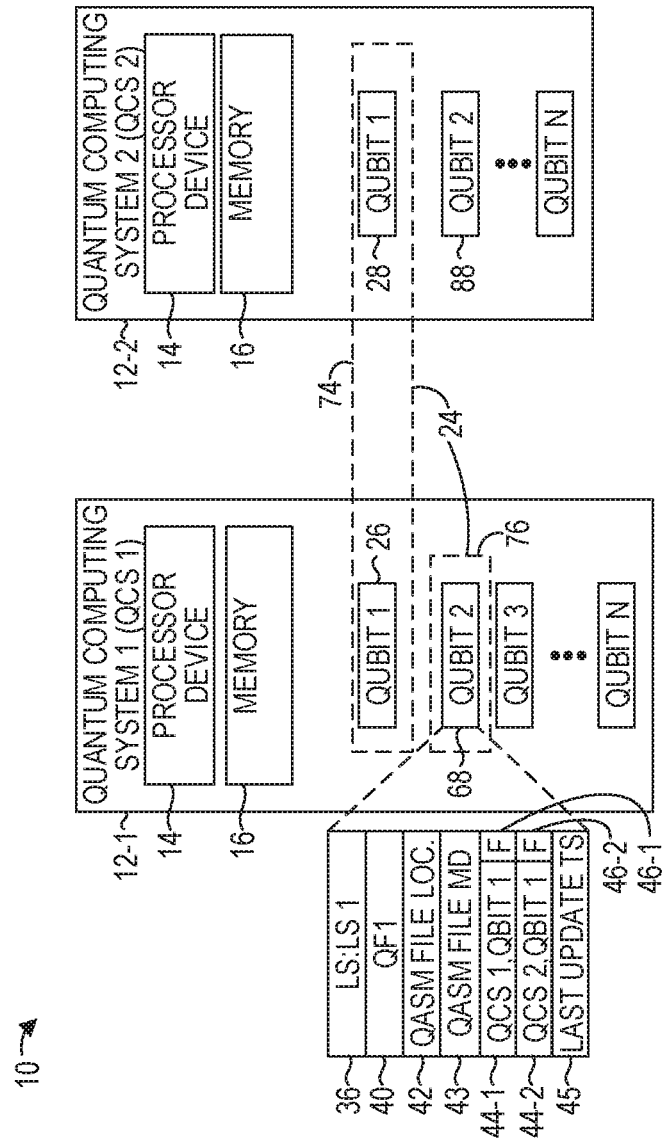
FIG. 10 is a simplified block diagram of the environment illustrated in FIG. 7A, according to one example.

FIG. 10 is a simplified block diagram of the environment illustrated in FIG. 7A, according to one example. The environment 10 includes the quantum computing system 12-1, which includes the memory 16 and the at least one processor device 14 coupled to the memory 16. The processor device 14 is to receive a request to provide the quantum file 24 that resides on the quantum computing system 12-1 to the quantum computing system 12-2, wherein the quantum file 24 comprises the qubit header portion 76 and the qubit data portion 74, the qubit header portion 76 being stored in the qubit 68 implemented by the quantum computing system 12-1 and the qubit data portion being stored in the qubits 26 and 28. In response to the request, the quantum computing system 12-1 moves, to the quantum computing system 12-2, the qubit header portion 76 from the qubit 68 implemented by the quantum computing system 12-1 to the qubit 88 implemented by the quantum computing system 12-2.

Figure 11:
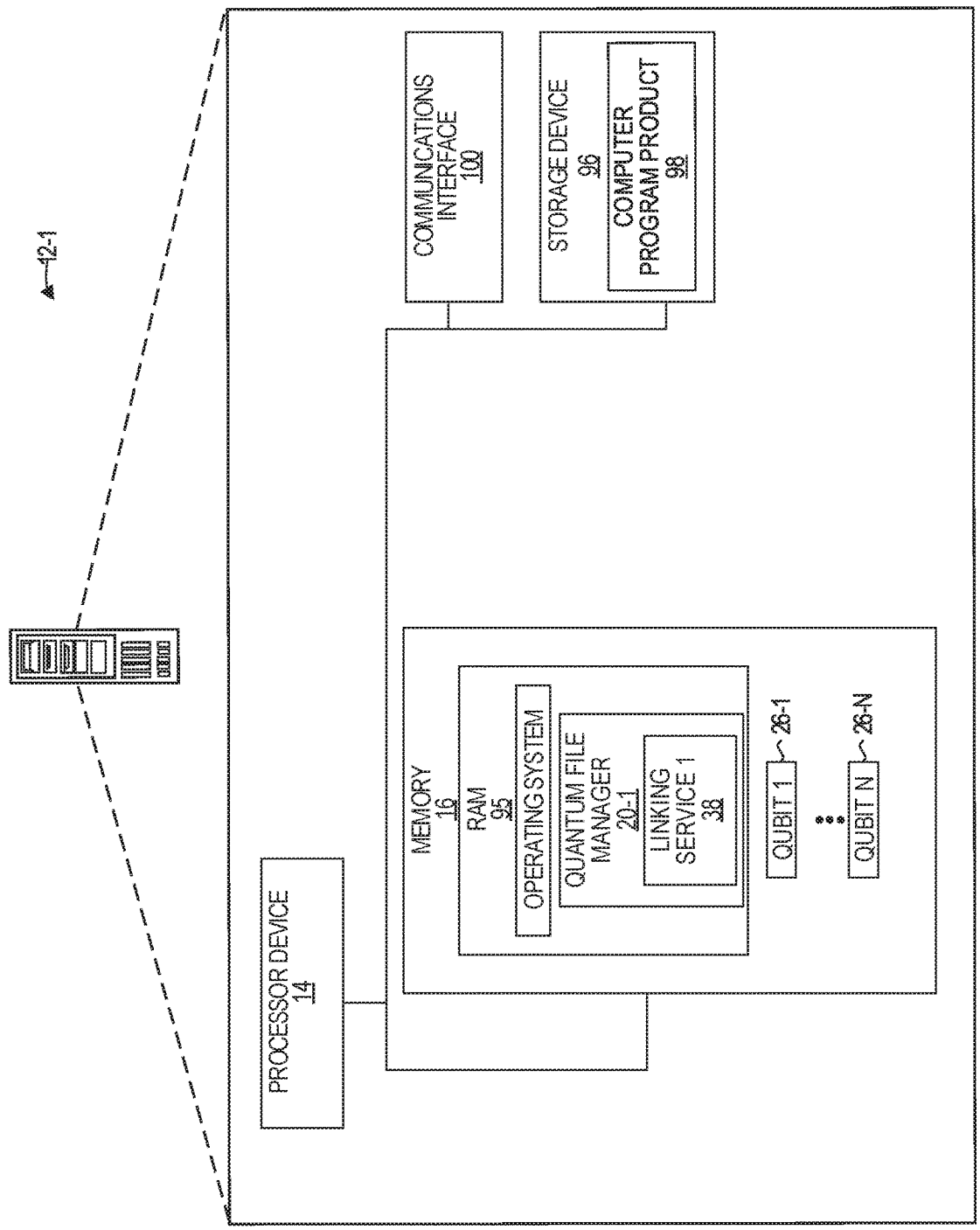
FIG. 11 is a block diagram of a quantum computing system suitable for implementing examples disclosed herein, according to one example.

FIG. 11 is a block diagram of the quantum computing system 12-1 suitable for implementing examples according to one example. The quantum computing system 12-1 may comprise any suitable quantum computing device or devices. The quantum computing system 12-1 can operate using classical computing principles or quantum computing principles. When using quantum computing principles, the quantum computing system 12-1 performs computations that utilize quantum-mechanical phenomena, such as superposition and entanglement. The quantum computing system 12-1 may operate under certain environmental conditions, such as at or near 0° Kelvin. When using classical computing principles, the quantum computing system 12-1 utilizes binary digits that have a value of either 1 or 0.

The quantum computing system 12-1 includes the processor device 14 and the system memory 16. The system memory 16 may include volatile memory 95 (e.g., random-access memory (RAM)). The quantum computing system 12-1 also includes one or more qubits 26-1-26-N.

The quantum computing system 12-1 may further include or be coupled to a non-transitory computer-readable storage medium such as a storage device 96, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 96 and other drives associated with computer-readable media and computer-usable media may provide non-volatile storage of data, data structures, computer-executable instructions, and the like.

A number of modules can be stored in the storage device 96 and in the volatile memory 95, including an operating system and one or more modules, such as the quantum file manager 20-1 and the linking service 38, each of which forms part of the quantum file management system 18 (FIG. 1). All or a portion of the examples may be implemented as a computer program product 98 stored on a transitory or non-transitory computer-usable or computer-readable storage medium, such as the storage device 96, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. An operator may also be able to enter one or more configuration commands through a keyboard (not illustrated), a pointing device such as a mouse (not illustrated), or a touch-sensitive surface such as a display device (not illustrated). The quantum computing system 12-1 may also include a communications interface 100 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a first quantum computing system, a request for the first quantum computing system to provide a quantum file that resides on the first quantum computing system to a second quantum computing system, wherein the quantum file comprises a qubit header portion and a qubit data portion, the qubit header portion being stored in one or more qubits implemented by the first quantum computing system and the qubit data portion being stored in one or more other qubits; and in response to the request, moving, by the first quantum computing system to the second quantum computing system, the qubit header portion from the one or more qubits implemented by the first quantum computing system to one or more qubits implemented by the second quantum computing system.

2. The method of claim 1 further comprising, in response to the request, retaining the qubit data portion in the one or more other qubits.

3. The method of claim 1 further comprising:
altering data associated with the first quantum computing system to indicate that the quantum file no longer resides on the first quantum computing system.

4. The method of claim 1 further comprising:
determining, by the first quantum computing system, that a particular qubit header move mechanism of a plurality of qubit header move mechanisms is a preferred qubit header move mechanism; and
utilizing the particular qubit header move mechanism to move the qubit header portion from the one or more qubits implemented by the first quantum computing system to the one or more qubits implemented by the second quantum computing system.

5. The method of claim 1 further comprising:
wherein the qubit data portion is stored on at least one qubit, and prior to moving the qubit header portion from the one or more qubits implemented by the first quantum computing system to one or more qubits implemented by the second quantum computing system, determining, by the first quantum computing system that the one or more qubits on which the qubit header portion is stored are not entangled and that the at least one qubit on which the qubit data portion is stored is not entangled.

6. The method of claim 1 further comprising:
distributing, by the first quantum computing system or the second quantum computing system to at least one other quantum computing system, an update message that indicates that the quantum file now resides on the second quantum computing system.

7. The method of claim 1 further comprising:
subsequent to moving the qubit header portion from the one or more qubits implemented by the first quantum computing system to the one or more qubits implemented by the second quantum computing system, altering, by the second quantum computing system, data associated with the second quantum computing system to indicate that the quantum file resides on the second quantum computing system.

8. The method of claim 1 further comprising:
monitoring, by the first quantum computing system, a communications channel monitored by a plurality of quantum computing systems including the second quantum computing system and a third quantum computing system;
detecting, by the first quantum computing system on the communications channel, a request for the quantum file;

determining, by the first quantum computing system, that the first quantum computing system owns the quantum file; and sending a message on the communications channel that indicates that the first quantum computing system owns the quantum file.

9. The method of claim 1 wherein the request to provide the quantum file to the second quantum computing system includes a temporary indicator indicating that the quantum file will subsequently be returned to the first quantum computing system by the second quantum computing system.

10. The method of claim 9 further comprising:
altering, by the first quantum computing system, data associated with the first quantum computing system that indicates that the quantum file is currently unavailable.

11. The method of claim 10 further comprising:
receiving, by the first quantum computing system from the second quantum computing system, a message indicating that the quantum file is to be migrated back to the first quantum computing system;
identifying an available qubit implemented on the first quantum computing system; and
storing, by the first quantum computing system, the qubit header portion received from the second quantum computing system in the available qubit.

12. The method of claim 11 further comprising:
subsequent to storing the qubit header portion received from the second quantum computing system in the available qubit, altering, by the first quantum computing system, the data associated with the first quantum computing system that indicates that the quantum file is currently unavailable to indicate that the quantum file is available.

13. A first quantum computing system, comprising:
a memory; and
at least one processor device coupled to the memory to:
receive a request to provide a quantum file that resides on the first quantum computing system to a second quantum computing system, wherein the quantum file comprises a qubit header portion and a qubit data portion, the qubit header portion being stored in one or more qubits implemented by the first quantum computing system and the qubit data portion being stored in one or more other qubits; and
in response to the request, move, to the second quantum computing system, the qubit header portion from the one or more qubits implemented by the first quantum computing system to one or more qubits implemented by the second quantum computing system.

14. The first quantum computing system of claim 13 wherein the processor device is further to, in response to the request, retain the qubit data portion in the one or more other qubits.

15. The first quantum computing system of claim 13 wherein the processor device is further to:

determine that a particular qubit header move mechanism of a plurality of qubit header move mechanisms is a preferred qubit header move mechanism; and
utilize the particular qubit header move mechanism to move the qubit header portion from the one or more qubits implemented by the first quantum computing system to the one or more qubits implemented by the second quantum computing system.

16. The first quantum computing system of claim 13 wherein the request to provide the quantum file to the second quantum computing system includes a temporary indicator indicating that the quantum file will subsequently be returned to the first quantum computing system by the second quantum computing system.

17. A non-transitory computer-readable storage medium comprising programming instructions, which, when executed by a processor device of a first quantum computing system, cause the processor device to:
receive a request to provide a quantum file that resides on the first quantum computing system to a second quantum computing system, wherein the quantum file comprises a qubit header portion and a qubit data portion, the qubit header portion being stored in one or more qubits implemented by the first quantum computing system and the qubit data portion being stored in one or more other qubits; and
in response to the request, move, to the second quantum computing system, the qubit header portion from the one or more qubits implemented by the first quantum computing system to one or more qubits implemented by the second quantum computing system.

18. The non-transitory computer-readable storage medium of claim 17 wherein the instructions are further to, when executed by the processor device, cause the processor device to, in response to the request, retain the qubit data portion in the one or more other qubits.

19. The non-transitory computer-readable storage medium of claim 17 wherein the instructions are further to, when executed by the processor device, cause the processor device to determine that a particular qubit header move mechanism of a plurality of qubit header move mechanisms is a preferred qubit header move mechanism; and
utilize the particular qubit header move mechanism to move the qubit header portion from the one or more qubits implemented by the first quantum computing system to the one or more qubits implemented by the second quantum computing system.

20. The non-transitory computer-readable storage medium of claim 17 wherein the request to provide the quantum file to the second quantum computing system includes a temporary indicator indicating that the quantum file will subsequently be returned to the first quantum computing system by the second quantum computing system.

* * * * *